United States Patent [19]
Lent et al.

[11] 3,789,791
[45] Feb. 5, 1974

[54] CHEMICAL HULL PATCH

[75] Inventors: Robert R. Lent, Houston, Tex.;
Francis G. Firth, El Segundo, Calif.

[73] Assignee: Tenneco Oil Company, Houston, Tex.

[22] Filed: Apr. 12, 1971

[21] Appl. No.: 133,255

[52] U.S. Cl............... 114/227, 114/50, 114/74 R, 169/2 A, 220/63 A
[51] Int. Cl............................................ B63b 23/16
[58] Field of Search....... 114/227, 228, 229, 50, 69, 114/74 A; 244/129 R, 135 B; 169/2 A, 27; 62/240; 44/7; 220/63 A

[56] References Cited
UNITED STATES PATENTS

| | | | |
|---|---|---|---|
| 3,291,333 | 12/1966 | House | 220/63 A X |
| 3,237,894 | 3/1966 | Wight | 244/129.1 |
| 3,174,550 | 3/1965 | Bugg | 169/2 A |
| 1,544,650 | 7/1925 | Kiwall | 114/50 |
| 2,798,364 | 7/1957 | Morrison | 114/74 A X |
| 2,929,221 | 3/1960 | Clauson | 114/74 A X |
| 2,933,902 | 4/1960 | Howard | 114/74 A X |

FOREIGN PATENTS OR APPLICATIONS

| | | | |
|---|---|---|---|
| 65,885 | 2/1914 | Austria | 114/50 |

*Primary Examiner*—Duane A. Reger
*Assistant Examiner*—Gregory W. O'Connor
*Attorney, Agent, or Firm*—Eugene S. Coddou; Carlos A. Torres

[57] ABSTRACT

A system and method in which in a preferred form, a network of breakable conduits are secured to the internal confining surfaces of a fluid containing structure such as the compartment walls of an oil tanker. The conduits are adapted to be broken upon rupture of the containing walls whereupon one or more reactive chemical agents are forced through the ruptured conduit system and are discharged into the confines of the structure in the area of the rupture where they react to form a solid or semi-solid mass of limited size. The resulting mass forms a localized blockage which reduces or terminates flow of the contained fluid through the point of rupture. Automatic control systems may be employed to initiate and terminate flow of the reactive agents through the pipe network.

23 Claims, 8 Drawing Figures

Robert R. Lent
Francis G. Firth
INVENTORS

BY Carlos A. Torres

ATTOR.

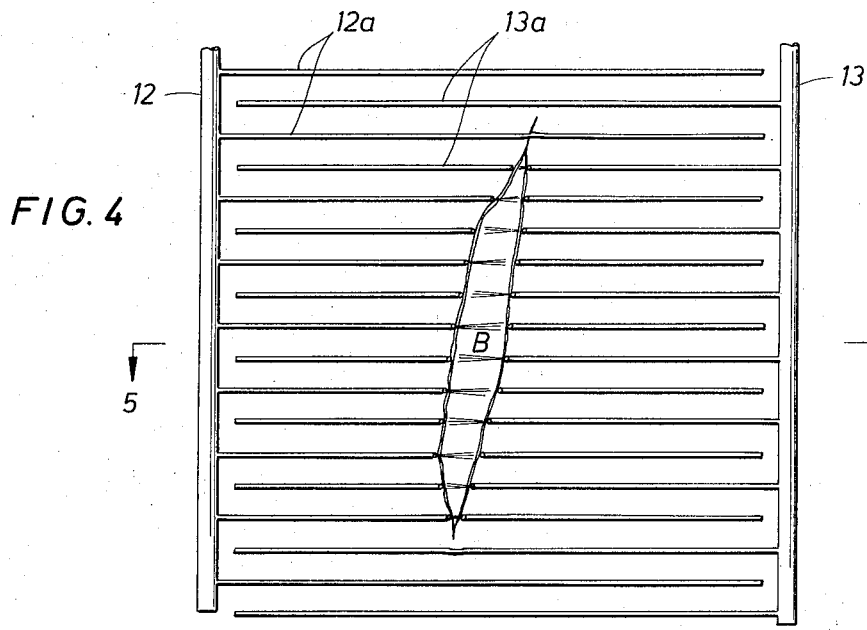
FIG. 4
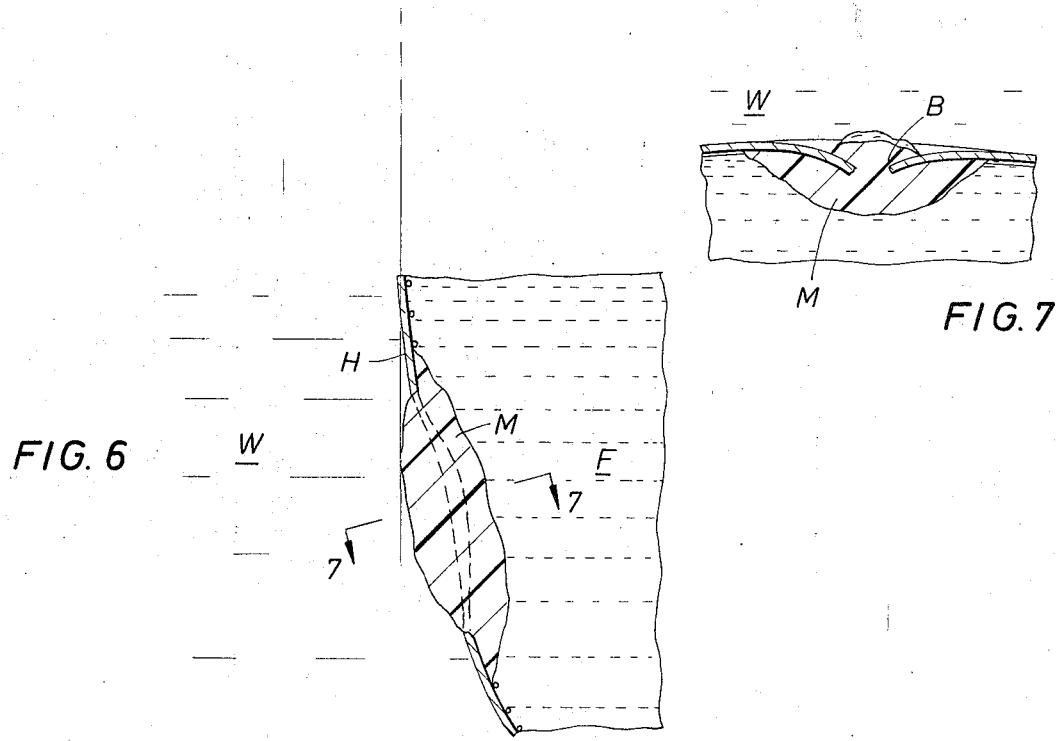
FIG. 6
FIG. 7
FIG. 5
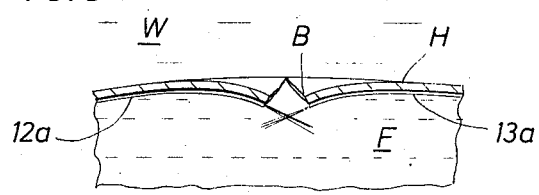
Robert R. Lent
Francis G. Firth
INVENTORS
BY Carlos A. Torres
ATTORNEY

CHEMICAL HULL PATCH

BACKGROUND OF THE INVENTION

1. Field of the Invention

The present invention relates to means and methods for preventing leakage of fluids from containers. In a particular application, the present invention is directed to a system and method for preventing leakage of oil, gasoline or other volatile fluids from large storage tanks or from the cargo holds of seagoing fuel tankers.

2. Brief Description of the Prior Art

Several techniques and systems have been disclosed in the prior art for the purpose of congealing the contents of aircraft fuel tanks prior to an impending crash to prevent the fuel from dispersing and igniting following impact. In general, these systems have included means to inject a suitable chemical into the fuel tanks of the aircraft causing the entire fuel load to gel or solidify. Injection of the solidifying agent is manually controlled, or in some instances, is controlled automatically by an impact sensing mechanism. In one specific prior art teaching, two chemicals from separate sources are combined just prior to injection into the fuel tanks. The injected chemicals react to form a foam block which completely fills the fuel tank and entraps the liquid fuel in cellular structures.

U.S. Pat. No. 3,285,718 to Whitfield et al. discloses a specific method for solidifying liquid fuel in the fuel tanks of vehicles. In one embodiment, the inventors disclose the use of two different chemicals which may be injected under pressure through nozzles to effect complete gelling of the entire tank contents. In another embodiment, the same inventors disclose a series of frangible, pressurized containers immersed in a fuel tank with the containers adapted to burst on impact to cause a violent mixing and gelling of the total fuel load. A third embodiment in the patent employs a double walled fuel tank construction with the space between the walls filled with a base chemical. When the internal tank wall is punctured, the base chemical mixes with the fuel which in turn has been premixed with a suitable fatty acid to produce a solid reaction product. Puncture of both inner and outer walls is said by the inventors to cause solidification of the material flowing from the container to maintain maximum safety in the area of dispersal.

While it is obviously desirable to prevent the flow of fuel from ruptures in large storage and tanker containers, the suggested methods of the prior art are undesirable for such applications to the extent that they require complete solidification of the entire fuel contents of the containers. Complete solidification or gelling prevents undesirable leakage but may also destroy the utility of the fuel for its originally intended purpose. Complete solidification may also require expensive, time consuming effort for removing the solidified fuel from its container to restore the container to operative condition.

Moreover, relatively large amounts of chemical additives which must be thoroughly mixed with the fuel are required to effect complete gelling. It is estimated that under some circumstances, as much as 10 percent of the total volume to be gelled must be additive chemicals. In large storage and tanker containers, relatively elaborate mixing and storage facilities would be required to obtain a complete gel. As applied to seagoing tankers, the required storage facilities and mixing equipment would substantially reduce the payload of the vessel. Complete gelling is also undesirable in that it requires an undesirably long time to effect a total mix of gelling chemicals and fuel. In addition, where the fuel containers are full, a large percentage of the fuel must first be displaced to accommodate the large quantities of gelling additives required to effect 100 percent solidification. Time is also lost during the displacement of the load required to accept the large quantities of additives and the injection of large quantities of additives may increase the pressure within the container causing an enlargement in a rupture. Rapid gelling of the entire contents may also induce a positive pressure because of the vast, large volume injection which may be required to effect total gelling thereby further tending to displace the ungelled fuel.

SUMMARY OF THE INVENTION

In the preferred form of the present invention, a network of frangible or breakable fluid conducting conduits are rigidly secured to the internal walls of a fuel containing structure such as a large storage tank or the cargo hold of a fuel tanker. The conduit network is supplied with reactive chemicals or agents from two separate sources or supply means. In plural container structures, such as those found in fuel tankers or in tank farms, the supply sources are connected to separate conduit networks formed along walls in each of the different containers. In the preferred form, the the conduits from one source of reactive agents are alternated with and closely spaced from the conduits from the other source of reactive agents. When a container wall is ruptured, the frangible pipe network secured to the wall is also ruptured at the same location and the two supply sources are automatically activated to force the reactive agents through the pipe network where they are discharged from the conduits at the breakage points. When the two reactive agents from the separate supply sources meet in the area of discharge, they react with each other to form a solid or semi-solid mass of limited size. The size of the mass continues to grow until it is sufficiently large to block fuel flow through the rupture in the container wall whereupon the supply of reactive agents is automatically terminated to stop continued growth of the mass. The higher pressure within the container cooperates with any adhesive quality present in the mass to hold the mass against the rupture to prevent the fuel contents from escaping the container. In its preferred form, the reactive agents injected into the fuel do not react with the fuel itself. If it is desirable to employ an agent which reacts with the fuel to form the solid or semi-solid mass, only limited quantities of the agent or agents are injected into the fuel to limit the size of the mass and to prevent complete solidification of the contents of the container.

The disposition of the conduits along the internal container wall causes the conduits from all sources to point to a single area following an inwardly directed blow or break. In a fuel tanker where such a break is most likely to occur, the broken ends of the two networks are automatically positioned to provide good mixing action which increases the efficiency of the operation.

Automatic equipment or means are provided to initiate flow of reactive agents when a break occurs. Automatic sensing means may be employed to terminate flow of the reactive agents when the desired mass and blockage have been produced. An alarm system may also be employed to signal the occurrence of a break in the conduit.

The present invention discloses a method and system which is rapid, economical and efficient in that only a small mass of solidified or gelled material is required to effect the desired flow blockage. In the preferred form, the conduits in the network do not contain any reactive agents until after the breakage occurs thus preventing corrosion or damage to the conduits and reducing the danger of accidental release of the agents. This latter feature also reduces the need for expensive, corrosion resistant alloys in the conduit network. These and other features and advantages of the present invention will be appreciated from the following description, the related drawings and the claims.

BRIEF DESCRIPTION OF THE DRAWINGS

FIG. 4 is a partial vertical elevation taken along the line 4—4 of FIG. 3 illustrating the hull breach;

FIG. 5 is a partial cross-section taken along the line 5—5 of FIG. 4;

FIG. 6 is a partial elevation, in section, illustrating a solid or semi-solid mass positioned over the rupture in the tanker hull; and FIG. 7 is a partial sectional view taken along the line 7—7 of FIG. 7.

DESCRIPTION OF THE PREFERRED EMBODIMENTS

Figure 1:
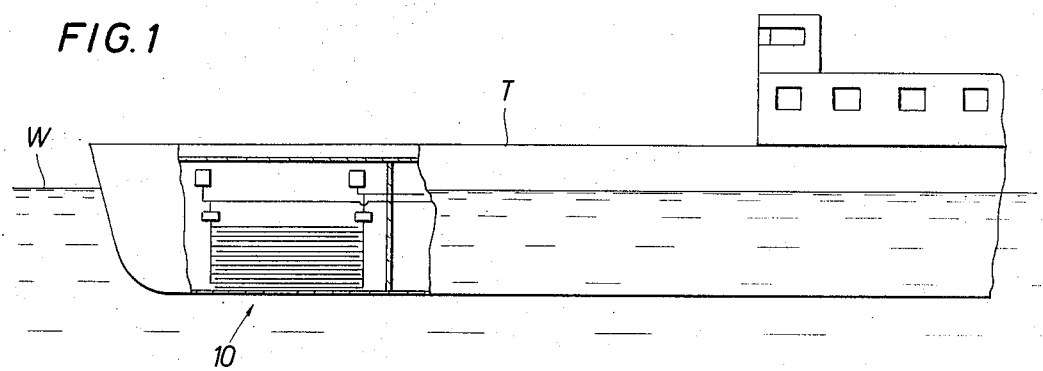
FIG. 1 is a vertical elevation, partially broken away, of the front portion of a fuel tanker illustrating a fuel compartment equipped with the preferred form of the system of the present invention.

With reference to FIG. 1 of the drawings, the system of the present invention is indicated generally at 10 in position within one compartment of a compartmented tank in a fuel tanker T floating in a body of water W. It will be understood that while the system and method of the present invention are described with specific reference to a fuel tanker, the teachings of the invention are applicable to any fluid confining structure or structures.

Figure 2:
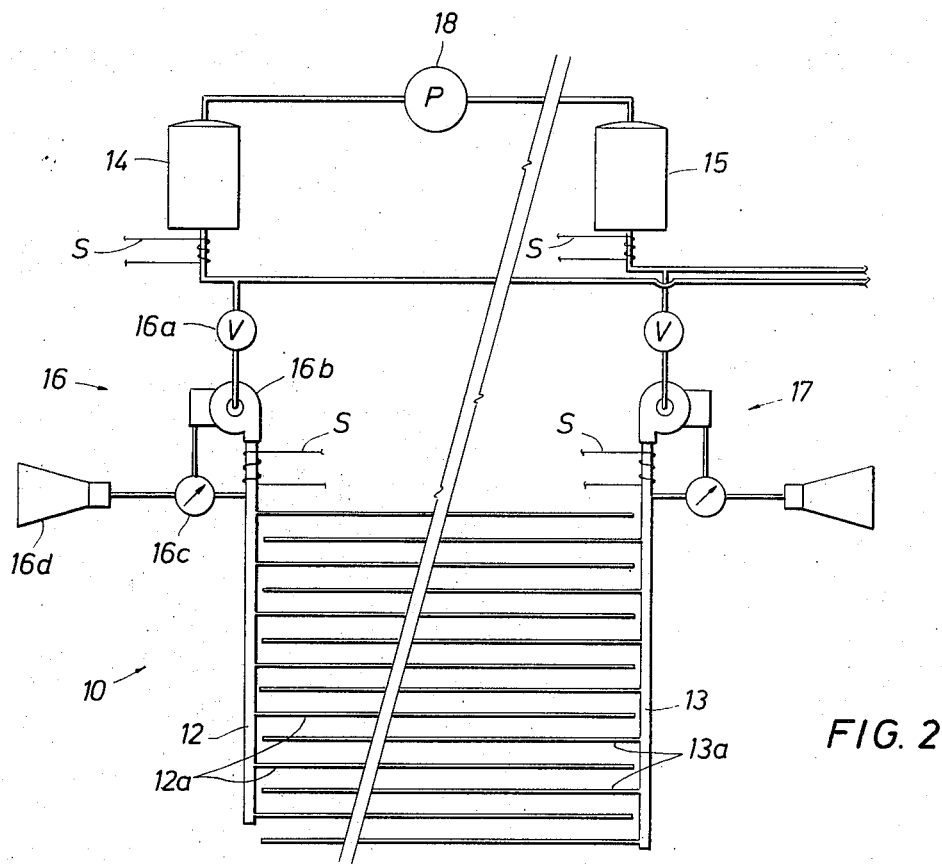
FIG. 2 is a schematic representation of the preferred form of the system of the present invention.

A schematic representation of the system of the present invention is shown in FIG. 2. The system 10 includes a network of frangible or breakable conduits 12a and 13a which are manifolded from larger supply conduits 12 and 13, respectively. In the preferred form, the conduits 12a and 13a are rigidly secured to the internal surface of the fuel containing compartment by welding W, as illustrated in FIG. 3a, or any other suitable means. The free ends of the smaller conduits 12a and 13a are plugged.

Conduit 12 supplying smaller conduits 12a is connected to a source of reactive agents 14 and conduit 13 supplying conduits 13a is connected to a separate source of reactive agents 15. As will be more fully described hereinafter, when a break occurs in the conduits 12a and 13a, the reactive agents in sources 14 and 15 are forced into conduits 12 and 12a and 13 and 13a, respectively, where they are then ejected from the breakage points in the smaller conduits. The conduits 12a and 13a may be constructed of any material which is capable of containing or conducting a flowable material under pressure and which breaks under predetermined conditions which may be associated with rupture or breakage of a fluid containing structure.

Reactive agents in the source 14 are conveyed to the conduit 12 and smaller conduits 12a by means of a suitable control system indicated generally at 16. A similar system indicated generally at 17 conveys reactive agents in the source 15 to the conduits 13 and 13a. The system 16 may include a suitable valving means 16a, a suitable pump 16b, suitable pressure detection means 16c and suitable alarm mechanism 16d which automatically function to convey reactive agents in the source 14 to the point of breakage in the conduits 12a at a pressure which exceeds the pressure of the fuel contained within the tanker compartment. Compartment 16d in the system, or its equivalent, provides a discernable alarm indicating the occurrence of a breakage in the conduits 12a. Similar components in the control system 16 function in the manner described with reference to the system 16 when a break occurs in the conduits 13a.

In the preferred form, a source 18 of pressurized gas or other suitable means is employed to maintain a predetermined pressure within the introducing system formed by the conduits, control systems and reactive agent sources. A drop in the pressure is detected by suitable means such as the pressure detecting system 16c in the system 16 to indicate formation of a break in the conduits 12a. Control system 17 is operated in a similar fashion. If desired, suitable heating means S may be employed to increase the temperature of the reactive agents before they are ejected from the introducing system to improve the reaction.

Figure 3:
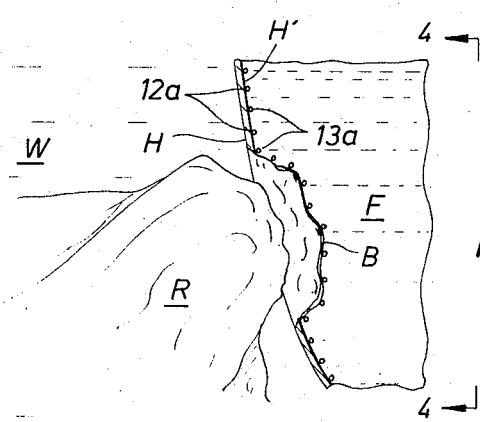
FIG. 3 is a partial vertical elevation, partially in section illustrating a portion of the hull of a fuel tanker striking a submerged obstacle and forming a breach in the hull.
Figure 3A:
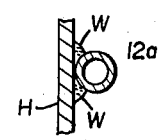
FIG. 3A is an enlarged detail view showing one method of connecting a conduit to the inner hull wall.

In FIG. 3, an outer hull wall H is illustrated impacting against a submerged obstacle such as a rock R causing a breach B in the external hull wall of the tanker T. The conduits 12a and 13a are illustrated in position along an internal surface H' of the external hull wall H. It will be appreciated that the hull wall H functions as a barrier preventing flow of fuel F from a relatively high pressure area in the tanker fuel chamber to a relatively lower pressure area externally of the chamber. The relatively lower pressure area may be that of the water W, a void in the hull construction (not illustrated) or the atmospheric pressure above the surface of the water W. Following formation of the breach B, the fluid F in the tanker compartment tends to flow across the barrier through the breach B to the lower pressure area externally of the fuel compartment.

When the hull is ruptured, the frangible conduits 12a and 13a secured to the internal surface H' of the hull H are also ruptured producing a drop in the internal pressure of the associated introducing system. This pressure drop is detected by any suitable means in the control systems 16 and 17 to open valves and to initiate operation of pumping or pressurizing means in the introducing system causing the reactive agents in the sources to be delivered to the point of rupture in the conduits where they are ejected in a relatively high pressure stream into the vicinity of the breach B.

With reference to FIGS. 4–7, as the reactive agents are ejected into the fuel, they react to form a solid or semi-solid mass M. The mass is permitted to grow until it reaches a desired size which is sufficient to partially or completely fill the breach to obstruct or completely terminate flow of the fuel F from the tanker fuel chamber. Once a flow stopping mass M has been formed, a back pressure is formed against the broken ends of the conduit means 12a and 13a causing an increase in the internal pressure of the introducing system. This pressure is detected by the control systems 16 and 17 causing the injection of the reactive agents to be automatically terminated. By this means, the size of the mass M is limited to prevent unnecessary displacement of the fuel F. Preferably, the heating means S is automatically activated to begin heating the reactive agents in the sources 14 and 15 immediately upon detection of the initial drop in pressure following rupture of the conduits 12a and 13a.

It will be understood that the components forming the control systems 16 and 17 are readily available and are conventional in all respects thus requiring no extensive explanation of their operation. Similarly, any conventional means may be employed for the heating means S and for the source of pressurized gas P.

If desired, the system may be operated so that the reactive agents contained in pressurized sources 14 and 15 are automatically ejected under the pressurizing force following a break in the conduits 12a and 13a without provision for pumping or other mechanical moving means.

In at least one form, it will be appreciated that the present invention describes a system of thin walled pipes or conduits 12a and 13a of steel or other suitable material secured to the inside of the hull of a fuel tanker.

It will also be readily appreciated that the small conduits 12a and 13a occupy a minimum volume in the fuel containing compartment and do not appreciably affect the space available for the fuel. The conduits 12a and 13a are preferably closely spaced and parallel to the fore and aft direction of the ship and are rigidly attached to the internal hull surface by suitable attachment means. In a preferred form, the conduits 12a and 13a are preferably of small section, less than 1 inch in diameter, and are manifolded at each end in alternate fashion to the two main feeder conduits 12 and 13, respectively, in the manner shown in FIG. 2. By this means, at least two different materials may be fed along the interior hull surface in alternate fashion in a parallel series of paralleled smaller conduits. Where a breach of the hull occurs in such a system, the smaller conduits 12a and 13a break and are directed inwardly at the breach point in the manner illustrated in FIG. 5. Where the introducing system is pressurized and contains suitable reactive fluids in each of the separate conduit networks, the reactants are injected into the fuel mass contained within the tanker compartment and mixed by turbulence to form a strong gel or mass M which will tend to block off the hull rupture and stop the flow of fluid from the tanker compartment.

In its preferred form, the reactive materials are held in the separate pressurized systems associated with sources 14 and 15 and are only operable when a break in the container wall occurs. After the break occurs, delivery of the reactants is at the point of maximum effectiveness and thus requires a minimum amount of reactants. In practice, this may conveniently be achieved by maintaining a low pressure of air or fluid, for example, 50 psi, in the conduit systems associated with each of the two sources. Since the system may automatically be turned on when a pressure drop is sensed, the system does not require that the frangible conduits contain reactants or that large volumes of the reactive materials be stored through the ship. The total volume required will be that of the system supplying the compartment where the break occurs, thus making the system a demand system with minimum stored volume requirements.

A large number of reactive agents may be employed in the system of the present invention. Preferably, such agents are capable of being stored for prolonger periods of time and will, when mixed in suitable ratios, rapidly form a solid or semi-solid mass, preferably in the presence of petroleum products or water. For example, U.S. Pat. Nos. 3,460,921, 3,285,718 and 3,174,550 describe reactive agents capable of reacting with each other or with petroleum products to form a solid or semi-solid mass. In a preferred form, where the reactive agents are to react with the fuel, the agents are introduced into the fuel containing chamber in limited amounts to prevent a complete gel of the entire fuel contents and to form a solid or semi-solid mass of limited dimensions which is suitable for blocking the leakage point. Reactive polyurethane foam systems, phenolic foams, solutions of polyvinyl alcohol and borax, special solvents such as amines, (for example, triamine) peptized with boric acid or other solutions, carboxolated vinyl polymers of high molecular weight dissolved in ethylene glycol neutralized with alkylies and other reactive agents and treatments may be employed to form the desired solid or semi-solid mass.

From the foregoing, it will be appreciated that while the system of the present invention has been described in detail as employed in only a single compartment within a fuel tanker, the manifolded, alternating frangible conduit network may also be employed in each of the remaining compartments in the tanker. Each of the compartments may have its individual control systems and sources of reactive agents or, as indicated generally in FIG. 2, may share the common source of reactive agents 14 and 15. Further in the way of example, the use of a frangible conduit network is not limited to the external hull walls of the tanker compartment and may readily be applied to the internal walls separating adjacent compartments within the tanker. In stationery tanks and storage containers, it is preferable to employ the frangible conduit network along the internal surface of the entire fluid barrier since the rupture may occur at any point. In the case of seagoing vessels, however, the most likely area of breakage and the one where the most damage can be expected is along the external hull surfaces and for this reason, the frangible conduit network may be limited to this area, if desired.

It will be understood that while a specific form of the present invention has been described, various modifications may be made without departing from the scope of the invention.

What is claimed is:

1. A process for remotely obstructing or terminating fluid flow from a relatively high pressure liquid containing area to a relatively low pressure area through a flow passage formed across a fluid barrier between said liquid containing area and said low pressure area wherein said barrier comprises the hull of an aquatic vessel, said high pressure area comprises a chamber in said vessel containing a non-solid, non-semisolid cargo fluid such as a relatively low viscosity crude oil, said low pressure area comprises a body of water in which the vessel is floating, the atmosphere above the water surface or a low pressure area within the hull construction, said flow passage comprises a breach in the hull of said vessel formed below the surface of the cargo fluid which breach communicates with the body of water, the atmosphere or the low pressure area within the hull construction comprising the steps of:

a. conducting through one or more supply conduits, one or more reactive agents capable of reacting to form a flow passage bridging amount of a semisolid or solid mass which can obstruct fluid flow through said hull breach;

b. introducing from outlet openings in said conduits in the vicinity of said breach on the high pressure side of said hull said one or more reactive agents;

c. reacting said one or more reactive agents to form said mass in a relatively small portion of said liquid containing area wherein only a limited amount of said mass is formed in said chamber whereby a major portion of said chamber may contain said cargo fluid; and d. blocking at least a portion of said breach with said mass to obstruct or terminate fluid flow through said breach.

2. A process as defined in claim 1 wherein:

a. said reactive agents are introduced into said chamber through said outlet openings in said one or more supply conduits;

b. said outlet openings are disposed adjacent said hull breach; and c. said reactive agents are reacted adjacent said hull breach to form a mass which, in part, is held against said hull and at least partially over and in said breach by the pressure exerted by said cargo fluid.

3. A process as defined in claim 2 wherein two or more different reactants from separate sources are introduced into said chamber under pressure through separate conduit outlet openings disposed on opposite sides of said breach whereby said two or more reactants are ejected from said outlet openings in turbulent streams which meet to cause mixing of the reactants with each other.

4. A process as defined in claim 3 wherein introduction of said reactive agents is terminated when the back pressure acting against said conduit outlet openings changes from a predetermined, established value.

5. A process as defined in claim 4 further including the step of heating said reactive agents prior to ejecting said agents from said conduit outlet openings.

6. A system for obstructing or terminating fluid flow in a flow passage which may be formed through a barrier separating a relatively high pressure area and a relatively low pressure area comprising:

a. one or more reactive agents capable of reacting to form a solid or semi-solid mass which can obstruct fluid flow;

b. introducing means including elongate conduit means connected with a source means containing said one or more reactive agents, said conduit means associated with said barrier for introducing said agents into said high pressure area;

c. connecting means linking said conduit means and said barrier for transmitting movement or distortion of said barrier to said conduit means; and d. release means included with said introducing means and responsive to movement or distortion of said barrier for discharging said one or more reactive agents from said introducing means into the vicinity of a movement or distortion of said barrier whereby said agent or agents may react to form said mass in the vicinity of a flow path formed through said barrier to thereby obstruct or terminate fluid flow through said flow passage.

7. A system as defined in claim 6 wherein:

a. said conduit means are supplied with at least two different reactive agents maintained in separate sources in said introducing means; and b. said release means include breakable conduit walls in said conduit means which are breakable upon predetermined movement, distortion or breakage of said barrier in the vicinity of such movement, distortion or breakage whereby said reactive agents may flow through a break in said conduit means to be dischargeed at a break or flow passage formed in said conduit walls.

8. A system as defined in claim 6 further including:

a. first detection means for sensing a predetermined decrease of pressure within said introducing means; and b. first control means connected with said first detection means for initiating the flow of said one or more agents through said introducing means to be discharged through said release means when said predetermined pressure decrease is detected.

9. A system as defined in claim 8 further including:

a. second detection means for sensing a predetermined increase in pressure within said introducing means; and b. second control means connected with said second detection means for terminating flow of said one or more agents when said predetermined pressure increase is detected.

10. A system for obstructing or terminating fluid flow in a flow passage which may be formed through a barrier separating a relatively high pressure area and a relatively low pressure area comprising:

a. at least two reactive agents capable of reacting to form a solid or semi-solid mass which can obstruct fluid flow;

b. introducing means including a plurality of elongate conduit means connected with separate source means containing said reactive agents and associated with said barrier for introducing said agents into said high pressure area;

c. connecting means linking said conduit means and said barrier for transmitting movement or distortion of said barrier to said conduit means;

d. release means included with said introducing means and responsive to movement or distortion of said barrier for discharging said reactive agents from said introducing means into the vicinity of a movement or distortion of said barrier whereby said agents may react to form said mass in the vicinity of a flow path formed through said barrier to thereby obstruct or terminate fluid flow through said flow passage, said release means including breakable conduit walls in said conduit means which are breakable upon predetermined movement, distortion or breakage of said barrier in the vicinity of said movement, distortion or breakage whereby said reactive agents may flow through a break in said conduit means to be discharged at a break or flow opening formed in said conduit walls; and e. first and second elongate conduits included in said conduit means carried along said barrier and connected respectively with first and second sources of reactive agents with at least two of said first conduits being spaced laterally from and separated by at least one of said second conduits.

11. A system as defined in claim 10 wherein a plurality of said first and second conduits are rigidly secured to the high pressure side of said barrier and are alternated with each other along at least a portion of said barrier.

12. A system as defined in claim 11 further including:
a. first and second detecting means for respectively detecting a predetermined decrease in pressure in said conduit means resulting from conduit breakage and for detecting a predetermined pressure increase in said conduit means resulting from an increased back pressure acting against said conduit break; and
b. control means connected with said first and second detection means for respectively initiating the flow of said reactive agents through said conduit means to be discharged at said conduit breakage points and for terminating the flow of said agents when said semi-solid mass produces a predetermined back pressure against said conduit breakage points.

13. A system as defined in claim 12 wherein said introducing means further includes means for heating said reactive agents before discharging them into said high pressure area.

14. A system as defined in claim 10 further including:
a. first detection means for sensing a predetermined decrease of pressure in said first or second conduits; and
b. first control means connected with said first detection means for initiating the flow of reactive agents through said first and second conduit means to be discharged through a break in said conduit means when said predetermined decrease of pressure is sensed.

15. A leakage repair system for a fluid containable structure comprising:
a. breakable conduit means for containing reactive agents;
b. connecting means connecting said conduit means to at least a portion of the internal, confining surface of said structure;
c. at least two reactive agents of the type which react with each other to form a solid or semi-solid mass;
d. supply means connected with said conduit means for conveying said reactive agents through said conduit means upon the occurrence of a break in said conduit means whereby said agents are discharged into the internal portion of said fluid containable structure;
e. at least two conduit means connected with said supply means for conveying each of said two reactive agents through separate conduit means, said two conduit means being rigidly secured to at least a portion of the internal surface of said structure and substantially alternated with each other;
f. first detecting means included in said supply means for detecting a drop in pressure in said conduit means resulting from a breakage of said conduit means; and
g. first control means connected with said first detecting means for initiating the conveyance of said reactive agents through said conduit means upon the occurrence of said breakage.

16. A system as defined in claim 15 wherein said fluid containable structure includes a cargo tank of a sea going vessel.

17. A process for remotely obstructing or terminating fluid flow from a relatively high pressure liquid containing area to a relatively low pressure area through a flow passage formed across a fluid barrier between said liquid containing area and said low pressure area comprising the steps of:
a. conducting through one or more supply conduits, one or more reactive agents capable of reacting to form a flow passage bridging amount of a semi-solid or solid mass which can obstruct flow through said passage;
b. introducing from outlet openings in said conduits in the vicinity of said flow passage on the high pressure side of said barrier said one or more reactive agents;
c. combining and reacting said one or more reactive agents with fluid in said low pressure area to form said mass in a relatively small portion of said liquid containing area; and
d. blocking at least a portion of said fluid passage with said mass to obstruct or terminate fluid flow through said flow passage.

18. A process for remotely obstructing or terminating fluid flow from a relatively high pressure liquid containing area to a relatively low pressure area through a flow passage formed across a fluid barrier between said liquid containing area and said low pressure area comprising the steps of:
a. conducting through one or more supply conduits, one or more reactive agents capable of reacting to form a flow passage bridging amount of a semi-solid or solid mass which can obstruct fluid flow through said passage;
b. introducing from outlet openings in said conduits in the vicinity of said flow passage on the high pressure side of said barrier said one or more reactive agents;
c. reacting said one or more reactive agents to form said mass in a relatively small portion of said liquid containing area;
d. blocking at least a portion of said fluid passage with said mass to obstruct or terminate fluid flow through said flow passage; and
e. terminating introduction of said one or more reactive agents when the back pressure acting against said outlet openings in said one or more supply conduits exceeds a predetermined maximum value.

19. A leakage repair system for a fluid containable structure comprising:
a. at least two unbreakable conduit means for containing reactive agents;
b. connecting means connecting said conduit means to at last a portion of the internal, confining surface of said structure;
c. at least two reactive agents capable of reacting with each other to form a solid or semi-solid mass;

d. supply means connected with said conduit means for conveying each of said two reactive agents through separate conduit means upon the occurrence of a break in said conduit means whereby said agents are discharged into the internal portion of said fluid containable structure;

e. first detecting means in said supply means for detecting a drop in pressure in said conduit means resulting from a breakage of said conduit means; and f. first control means connected with a first detecting means for initiating the conveyance of said reactive agents through said conduit means upon the occurrence of said breakage.

20. A system as defined in claim 19 wherein said supply means further includes;

a. second detection means for sensing a predetermined increase in pressure in said conduit means; and b. second control means connected with said second detecting means for terminating the conveyence of said reaction agents through said conduit means when said predetermined pressure increase is detected.

21. A system as defined in claim 19 further including means for heating said reactive agents before they are discharged into said structure.

22. A system as defined in claim 19 wherein said two conduit means are rigidly secured to at least a portion of the internal surface of said structure and are substantially alternated with each other.

23. A system as defined in claim 22 wherein said fluid containable structure includes the cargo tank of a sea-going vessel.

* * * * *